United States Patent
Ehrlich et al.

(10) Patent No.: US 7,167,336 B1
(45) Date of Patent: Jan. 23, 2007

(54) METHOD FOR PROVIDING VARIABLE GAIN, ITERATIVE EMBEDDED RUNOUT CORRECTION IN A DISK DRIVE

(75) Inventors: Richard M. Ehrlich, Saratoga, CA (US); Don Brunnett, Pleasanton, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/410,576

(22) Filed: Apr. 8, 2003
(Under 37 CFR 1.47)

Related U.S. Application Data

(60) Provisional application No. 60/371,234, filed on Apr. 8, 2002.

(51) Int. Cl.
*G11B 5/596* (2006.01)

(52) U.S. Cl. .................................... 360/77.04
(58) Field of Classification Search ............. 360/77.04, 360/75, 77.02, 77.08
See application file for complete search history.

(56) References Cited

U.S. PATENT DOCUMENTS

| | | | |
|---|---|---|---|
| 5,402,280 A * | 3/1995 | Supino | 360/77.04 |
| 5,793,559 A | 8/1998 | Shepherd et al. | 360/78.09 |
| 6,061,200 A | 5/2000 | Shepherd et al. | 360/77.04 |
| 6,115,203 A | 9/2000 | Ho et al. | 360/77.04 |
| 6,437,936 B1 * | 8/2002 | Chen et al. | 360/77.04 |
| 6,549,362 B1 | 4/2003 | Melrose et al. | 360/77.04 |
| 2003/0112545 A1 * | 6/2003 | Hanson et al. | 360/77.04 |
| 2003/0123180 A1 * | 7/2003 | Settje et al. | 360/77.04 |
| 2003/0133220 A1 * | 7/2003 | Hsin | 360/77.04 |
| 2003/0184909 A1 * | 10/2003 | Zhang et al. | 360/77.04 |

OTHER PUBLICATIONS

Hargarten et al., "Method and Apparatus for Determining Embedded Runout Correction Valves Using Feedback," U.S. Appl. No. 10/318,316.

* cited by examiner

*Primary Examiner*—Hoa T. Nguyen
*Assistant Examiner*—James L Habermehl
(74) *Attorney, Agent, or Firm*—Tejpal S. Hansra

(57) ABSTRACT

A method for determining embedded runout correction (ERC) values using iteration and variable gain in a disk drive. A disk has a track written thereon, an ERC value is determined for a servo sector on the track using variable gain, and the variable gain decreases based on the number of revolutions of the disk.

70 Claims, 5 Drawing Sheets

METHOD FOR PROVIDING VARIABLE GAIN, ITERATIVE EMBEDDED RUNOUT CORRECTION IN A DISK DRIVE

CROSS-REFERENCE TO RELATED APPLICATIONS

This application claims priority from U.S. Provisional Application Ser. No. 60/371,234 filed Apr. 8, 2002, which is incorporated herein by reference in its entirety.

FIELD OF THE INVENTION

The present invention relates to transducer positioning in a data storage device. More particularly, the present invention relates to compensating for repeatable runout (RRO) in a disk drive.

BACKGROUND OF THE INVENTION

A disk drive is a data storage device that stores digital data in tracks on a disk. Data is read from or written to a track of the disk using a transducer, which includes a read element and a write element, and is held close to the track while the disk spins about its center at a substantially constant angular velocity. To properly locate the transducer near the desired track during a read or write operation, a closed-loop servo control system is generally implemented. The servo control system uses servo data read from the disk to align the transducer with the desired track. The servo data is generally written to the disk using a servo track writer (STW). However, there has been movement towards having the disk drive self-servo write some or all of the servo data.

In an ideal disk drive, the tracks of the disk are non-perturbed circles situated about the center of the disk. As such, each of these ideal tracks includes a track centerline that is located at a known constant radius from the disk center. In an actual disk drive, however, it is difficult to write non-perturbed circular tracks to the disk. That is, due to certain problems (e.g., vibration, bearing defects, inaccuracies in the STW and disk clamp slippage), the tracks are generally written differently from the ideal non-perturbed circular shape. Positioning error created by the perturbed nature of these tracks is known as written-in repeatable runout (WRRO).

The perturbed shape of these tracks complicates the transducer positioning during read and write operations because the servo control system needs to continuously reposition the transducer during track-following to keep up with the constantly changing radius of the track centerline with respect to the center of the spinning disk. Furthermore, the perturbed shape of these tracks can result in track squeeze and track misregistration errors during read and write operations.

Disk drive manufacturers have developed techniques to measure the WRRO so that compensation values (also known as embedded runout correction values or ERC values) may be generated and used to position the transducer along an ideal track centerline. Examples of such techniques may be found in U.S. Pat. No. 4,412,165 to Case et al. entitled "Sampled Servo Position Control System," U.S. Pat. No. 5,793,559 to Shepherd et al. entitled "In Drive Correction of Servo Pattern Errors," U.S. Pat. No. 6,115,203 to Ho et al. entitled "Efficient Drive-Level Estimation of Written-In Servo Position Error" and U.S. Pat. No. 6,549,362 to Melrose et al. entitled "Method and Apparatus for the Enhancement of Embedded Runout Correction in a Disk Drive," all of which are incorporated herein by reference.

A STW may generate the ERC values to correct non-ideal tracks. For example, the transducer may be held over a specified radial position, which (approximately) corresponds to a center of an ideal track, using an external position reference. The position error signal (PES) can then be measured on a sector-by-sector basis over multiple revolutions of the disk, and the PES can be averaged (again, on a sector-by-sector basis) to average-out non-repeatable runout (NRRO). The averaged PES could then be used to generate ERC values to correct the tracks.

Because a STW is an extremely expensive piece of capital equipment, instead of using a STW, the ERC values are generally generated during the disk drive self-test.

FIG. 1 illustrates determining the ERC values using a conventional "one-shot" technique. The PES associated with each servo sector of a track is collected over multiple revolutions (e.g., 4–8 revolutions) of the disk and then averaged to obtain the position error due to repeatable runout (PES RRO). The PES RRO is then circularly convolved with the inverse impulse response of the servo control system to obtain the WRRO. The ERC values for the track are based on the WRRO. Furthermore, the ERC values are generated once.

In step 10, when following a track, the PES is measured and summed for each of the servo bursts associated with the track for N revolutions of the disk. Next, in step 20, the PES RRO is determined by dividing the sums by N to obtain the average PES associated with each of the servo bursts. The position error is averaged for N revolutions of the disk to average-out the affects of NRRO.

In step 30, the inverse impulse response (inverse transfer function) for the servo control system is obtained. The inverse impulse response may be obtained in a variety of ways, including those described in the Ho et al. and Melrose et al. patents. Furthermore, the inverse impulse response may be obtained for each transducer in the disk drive as described in the Melrose et al. patent.

Next, in step 40, the average PES RRO is circularly convolved with the inverse impulse response to obtain the WRRO. Finally, in step 50, the ERC values are determined and written to the disk based on the WRRO.

The ERC values may be represented by the following equation:

$$ERC(n) = \sum_{m=0}^{N-1} \overline{PES(m)} * \hat{h}_{inv}([n-m]\%N) \quad (1)$$

where ERC(n) is the ERC value computed for the $n^{th}$ servo wedge, $\overline{PES(m)}$ is the synchronously-averaged PES of the $m^{th}$ servo wedge, $\hat{h}_{inv}(j)$ is the $j^{th}$ sample of the estimated inverse impulse response of the servo control system and "%" is the modulo function where:

$(n-m)\%=n-m+N$ when $(n-m)<0$ and  (2)

$(n-m)\%=n-m$ when $0 \leq (n-m) < N$

While the one-shot technique has advantages, it also has drawbacks. For example, the one-shot technique cannot properly compensate for PES non-linearities (e.g., due to read asymmetry or other non-linear error sources), errors in modeling the inverse impulse response (e.g., gain errors or non-linearities), and errors introduced into the servo control system by NRRO (e.g., noise when measuring the PES RRO). Furthermore, the RRO may be so large that after the ERC values have been determined and applied (and thus the transducer position is changed as a function of time), the transducer sees significantly different RRO due perhaps to servoing on different servo bursts than those used for determining the ERC values.

Accordingly, it would be desirable to determine ERC values that reduce the aforementioned drawbacks.

SUMMARY OF THE INVENTION

The present invention meets the aforementioned, and other, needs. The present invention is directed to method for providing variable gain, iterative embedded runout correction in a disk drive.

In one embodiment, a disk has a track written thereon. An ERC value is determined for a servo sector on the track using variable gain, and the variable gain decreases based on the number of revolutions of the disk. For example, the variable gain is $$\frac{1}{i}$$

or $$\frac{1}{i+1}$$

where i is the number revolutions of the disk.

Other embodiments, objects, features and advantages of the present invention will be apparent from the following specification taken in conjunction with the following drawings.

DETAILED DESCRIPTION OF THE PREFERRED EMBODIMENT

Figure 1:
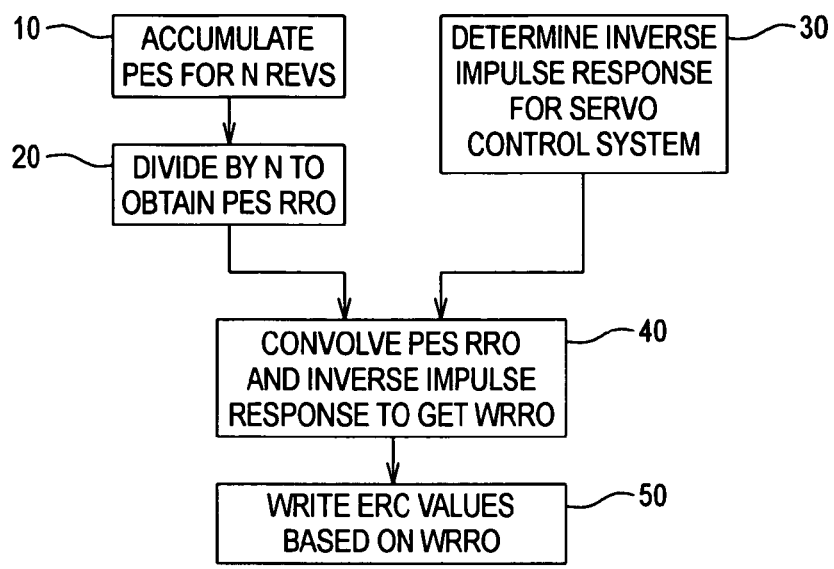
FIG. 1 is a flowchart illustrating a conventional technique for determining ERC values.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
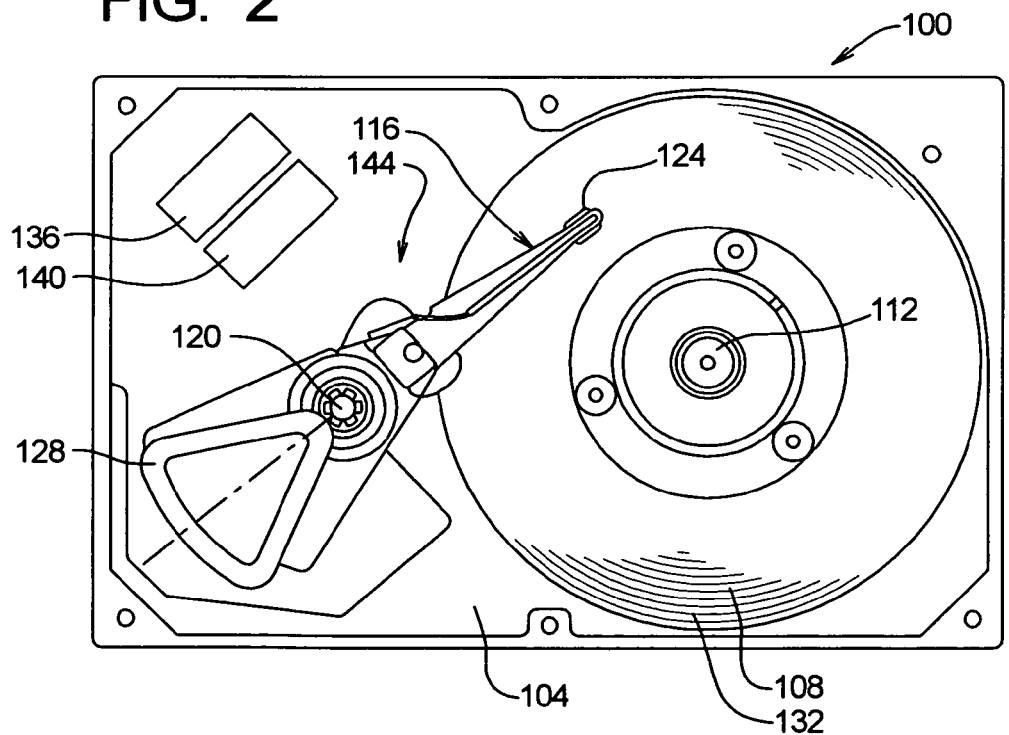
FIG. 2 is a diagrammatic representation illustrating a conventional disk drive, with its top cover removed, in which the present invention may be implemented.

FIG. 2 illustrates a disk drive 100 that includes a base 104 and a magnetic disk (or disks) 108 (only one of which is shown). The disk 108 is interconnected to the base 104 by a spindle motor (not shown) mounted within or beneath the hub 112 such that the disk 108 can be rotated relative to the base 104. An actuator arm assembly (or assemblies) 116 (only one of which is shown) is interconnected to the base 104 by a bearing 120. The actuator arm assembly 116 suspends a transducer 124 at a first end, and the transducer 124 (which includes a read element and a write element) transfers data to and from a surface of the disk 108. A voice coil motor 128 pivots the actuator arm assembly 116 about the bearing 120 to radially position the transducer 124 with respect to the disk 108. By changing the radial position of the transducer 124 with respect to the disk 108, the transducer 124 can access different tracks 132 on the disk 108. The voice coil motor 128 is operated by a controller 136 that is, in turn, operatively connected to a host computer (not shown). A channel 140 processes information read from the disk 108 by the transducer 124, and a servo control system 144 controls the position of the transducer 124 with respect to the track 132 being followed.

The servo control system 144 includes the transducer 124 being positioned, the actuator arm assembly 116, the voice coil motor 128, the controller 136 and the channel 140. The servo control system 144 provides an impulse response to a given input.

Figure 3:
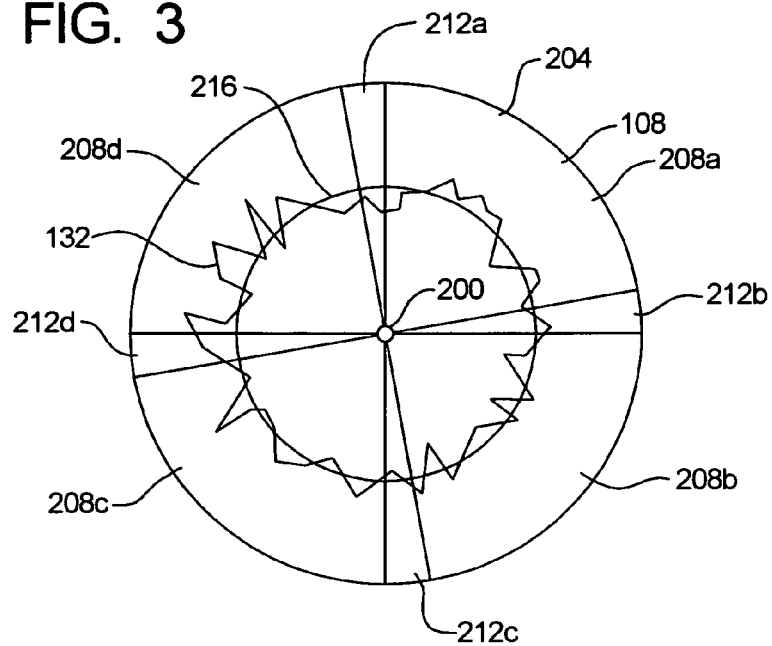
FIG. 3 is diagrammatic representation of a disk having a perturbed track.

FIG. 3 illustrates the disk 108 has substantially circular in shape and includes a center 200. The disk 108 also includes tracks 132 (only one of which is shown) on an upper surface 204 of the disk 108 for storing digital data. The tracks 132 are divided into data fields 208a–208d and servo sectors 212a–212d. Generally, the data fields 208a–208d are used for storing user data as a series of magnetic transitions, while the servo sectors 212a–212d are used for storing servo information, also as a series of magnetic transitions, that provide the transducer 124 with positioning information. In particular, the servo sectors 212a–212d provide the transducer 124 with information concerning its position over the disk 108. More particularly, the servo sectors 212a–212d provide information to the transducer 124 concerning the identity of the track 132 and the servo sector 212 over which the transducer 124 is flying, and concerning the position of the transducer 124 with respect to the centerline of the track 132.

Although the disk 108 is illustrated having a relatively small number of tracks 132 and servo sectors 212, a typical disk contains a very large number of tracks 132 and servo sectors 212. For example, disks having over 90,000 tracks per inch and over 250 servo sectors per track are presently available.

Track 132 is ideally non-perturbed and ideally shares a common center 200 with the disk 108, such as the ideal track 216. Due to imperfections, however, the actual written track 132 can be perturbed, such as the non-ideal track 132.

A perturbed or non-ideal track 132 is difficult for the transducer 124 to follow because the position of the transducer 124 must constantly be adjusted by the servo control system 144. Consequently, the positioning the transducer 124 is not as accurate on the written track 132 as it would be on the ideal track 216.

The tracks 132 are each divided into multiple data fields 208 and servo sectors 212. The servo sectors 212 include information for use by the disk drive 100 in locating the transducer 124 above a desired track 132. When a host computer requests that data be read from or written to a particular data field 208 in a particular track 132, the transducer 124 must be moved to the track 132 and then must be positioned at a predetermined location relative to the centerline of the track 132 before a data transfer can take place. The transducer 124 is placed on the track centerline in order to read from and write to the disk 108, however the present invention is not limited to reading and writing solely when the transducer 124 is placed at the track centerline. The present invention allows the transducer 124 to follow (approximately) the ideal representation (ideal track 216) of a perturbed track 132.

The disk drive 100 uses the information stored in the servo sectors 212 to locate the desired track 132 and to then appropriately position the transducer 124 with respect to the centerline of the desired track 132. The data fields 208 include user data that can be accessed by a host computer. In general, the number of servo sectors 212 per track 132 is a matter of design choice. The number may be dictated by, for example, a servo update rate.

Figure 4:
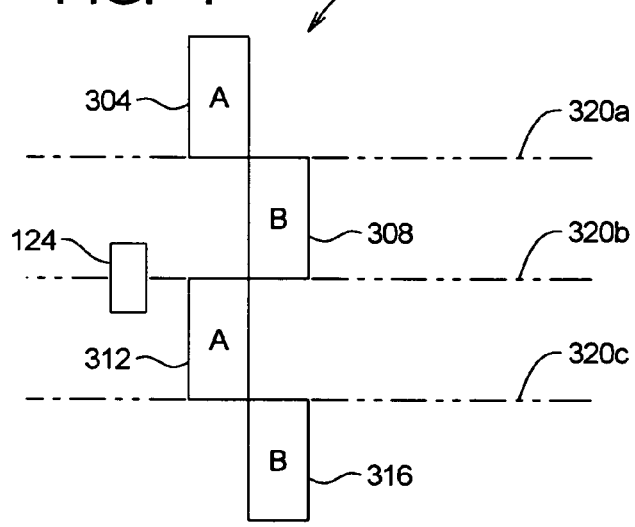
FIG. 4 is a diagrammatic representation of a servo burst pattern that may be used to position a transducer with respect to a track centerline.

FIG. 4 illustrates a typical servo pattern 300 stored within a servo sector 212 for centering the transducer head 124 on a desired track 132. The servo pattern 300 includes servo bursts 304, 308, 312 and 316 that define the centerlines 320a–320c of the tracks 132. The servo bursts 304, 308, 312 and 316 are divided into A servo bursts 304, 312 and B servo bursts 308, 316 that are each approximately a track-width wide and that alternate across the disk surface 204. The boundary between an A servo burst and an adjacent B servo burst (e.g., A servo burst 312 and B servo burst 308) defines the centerline (e.g., centerline 320b) of the track 132.

To center the transducer 124 using the A and B servo bursts, the transducer 124 is first moved to the desired track 132 during a seek operation and, once there, reads the A and B servo bursts on the desired track 132. The signal magnitudes resulting from reading the A and B servo bursts are then combined (such as by subtracting the B servo burst magnitude from the A servo burst magnitude) to achieve the PES. The PES indicates the distance between the center of the transducer 124 and the centerline (e.g., centerline 320b) of the desired track 132. The PES is used by the disk drive 100 to change the position of the transducer 124 to one that is closer to the desired (centered) position. This centering process is repeated for each successive servo sector 212 on the track 132 until the requested read/write operation has been performed in the appropriate data field 208. The present invention may be used with other schemes for storing servo information on the disk 108, such as schemes having four or more servo bursts, or schemes that use zones, constant linear density (CLD) recording, split data fields and/or hybrid servo.

Traditionally, the A servo bursts 304, 312 and the B servo bursts 308, 316 as well as all other servo information are written to the disk 108 using a STW after the disk 108 is assembled into the disk drive 100 during manufacturing. However, a variety of methods have been developed which do not use only the STW for writing servo information on the disk 108. For example, a portion of the servo information can be written using the STW and another portion of the servo information can be self-written by the transducers 124. Furthermore, the transducers 124 may self-write the entirety of the servo information. In addition, printed media may be used by the transducers 124 to self-write some or all of the servo information. The present invention may be used regardless of how the servo information is written to the disk 108. For example, WRRO may occur even though only some (or in some cases none) of the WRRO is due to a STW. That is, the servo information does not necessarily have to be written using a STW.

The A and B servo bursts define the location of the tracks 132 on the disk 108. That is, on a non-ideal track 132, the A and B servo bursts are written such that the centerline of the track 132 does not describe a perfect circle, but rather is perturbed. However, the transducer 124 can follow an ideal track 216 by adding appropriate ERC values in the servo sectors 212.

The offset between the centerline of the non-ideal track 132 and the ideal track 216 is different in each servo sector 212a–212d of the track 132. By determining WRRO values for the servo sectors 212 in a track 132, the ERC values may modify the PES so that the transducer 124 can follow (or closely approximate) the ideal track 216. The ERC values may then be stored, for example, in the servo sectors 212, in look-up tables maintained in the disk drive 100 or in any other suitable storage location, such as memory included in or accessible to the disk drive 100.

If the transducer 124 is to follow a perturbed path, such as the non-ideal track 132, then the position of the transducer 124 must constantly be adjusted as the disk 108 rotates. Therefore, when performing conventional track following on a non-ideal track 132, adjustments are constantly made to position the transducer 124 to keep it centered on the track 132. The transducer 124 position is adjusted by deriving a PES from the servo bursts, such as the A servo burst 312 and the B servo burst 308 where the centerline 320b is followed. The PES creates a control signal for the voice coil motor 128 (or other movement means) to move the transducer 124 an appropriate amount. Because the transducer 124 position is continuously being adjusted, perfect or near perfect registration between the transducer 124 and the centerline of the track 132 (e.g., centerline 320b) is rarely achieved. This can create problems such as high track misregistration.

Figure 5:
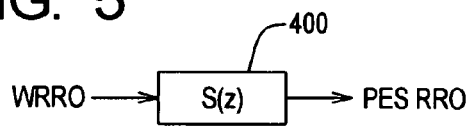
FIG. 5 is a block diagram that depicts the relationship between WRRO and the PES for a particular track.

FIG. 5 illustrates the PES RRO values derived from the servo sectors 212 associated with a track 132 during track-following are related to the WRRO values for the track 132 by a predetermined transfer function $S(z)$ 400. The transfer function 400, in general, describes how the servo control system 144 reacts to and follows the perturbed track 132. That is, WRRO is the stimulus and PES RRO is the response.

Figure 6:
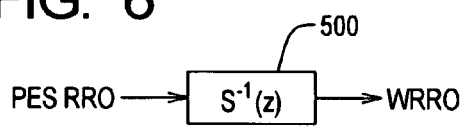
FIG. 6 is a block diagram that depicts the relationship between the PES and WRRO for a particular track.

FIG. 6 illustrates that to determine the WRRO values using the measured PES RRO values, the inverse transfer function $S^{-1}(z)$ 500 is determined and the PES RRO values are applied thereto (e.g., by circular convolution).

In the one-shot technique, the PES RRO is determined by summing the position error values associated with each servo sector 212 in a track 132 for multiple revolutions of the disk 108 while track-following, and then dividing the summed values by the number of revolutions of the disk 108 used to collect the position error data. After convolution, the ERC values are updated.

In contrast, in a preferred embodiment of the present invention, the ERC values are calculated and applied after each revolution of the disk 108 using variable gain and are used for collecting data for the next revolution of the disk 108. The ERC values may be represented by the following equation:

$$ERC_i(n) = ERC_{i-1}(n) + \alpha_i \sum_{m=0}^{N-1} PES_i(m) * \hat{h}_{inv}([n-m]\%N) \quad (3)$$

where $ERC_i(n)$ is the ERC estimate for the $n^{th}$ servo wedge which results from the $i^{th}$ (one-revolution) iteration for the ERC algorithm for the target servo track, $PES_i(m)$ is the PES RRO measured on the $i^{th}$ iteration, and $\alpha_i$ (the "variable gain") is a tunable parameter that provides a scaling factor (multiplier) for $ERC_i(n)$. The remaining portions of equation (3) correspond to equation (1) for the one-shot technique.

The starting ERC value for any given track, $ERC_0(n)$, can either be zero or a filtered version of the final ERC value from a previous track. Using a non-zero ERC value, $ERC_0(n)$, may be particularly useful when there is track-to-track correlation in the WRRO.

The variable gain $\alpha_i$ changes from iteration-to-iteration. Preferably, the variable gain $\alpha_i$ begins less than or equal to one and decreases for each subsequent iteration. In one embodiment, the variable gain $$\alpha_i = \frac{1}{i}.$$

In another embodiment, the variable gain $$\alpha_i = \frac{1}{i+1}.$$

The variable gain technique is more robust than the one-shot technique to errors in measurement or modeling of the inverse impulse response and to non-linearities in the servo control system. Furthermore, the robustness improves where the WRRO is so large that after the ERC values have been determined and applied (and thus the transducer position has changed), the transducer sees significantly different WRRO due perhaps to servoing on different servo bursts than those used for determining the ERC values. In addition, the NRRO sensitivity is not significantly increased as compared to the one-shot technique.

Figure 7:
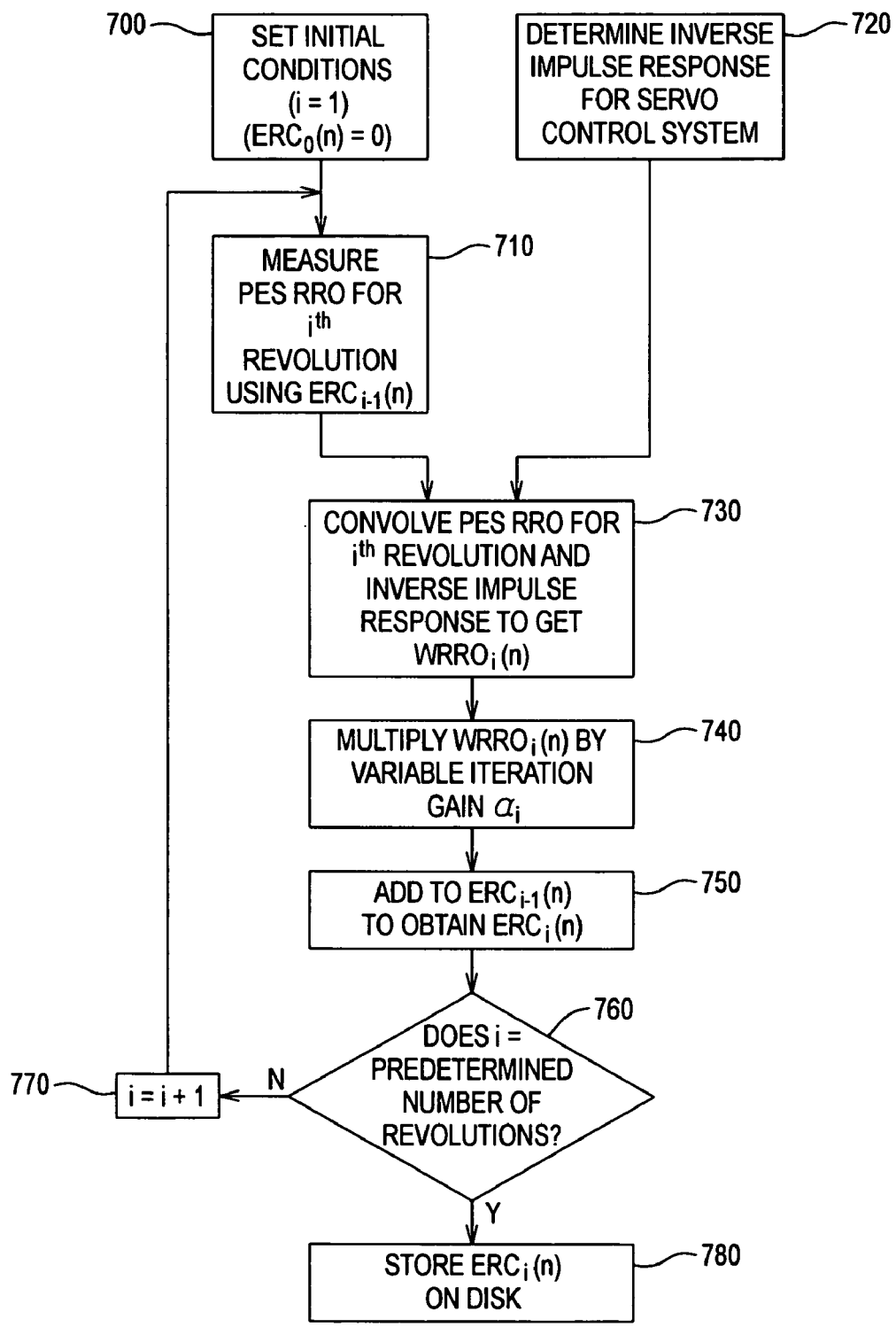
FIG. 7 is a flowchart illustrating a method for determining ERC values in accordance with an embodiment of the present invention.

FIG. 7 illustrates determining the ERC values in accordance with an embodiment of the present invention.

In step 700, the initial conditions are set for determining the ERC values for the first revolution of the disk. More specifically, i represents the revolution corresponding to the PES RRO values to be obtained and is set to one. Since no ERC occurred in the previous revolution, $ERC_0(n)$ is set to zero. However, $ERC_0(n)$ may be set to a non-zero value.

In step 710, the PES RRO is measured for an $i^{th}$ revolution using the ERC values from the previous revolution. The PES RRO measurement is made by track-following and measuring the position error associated with each servo sector in the track after applying the ERC values from the previous revolution on a servo sector by servo sector basis. When i is one (the first revolution) the ERC values in the initial conditions are treated as the ERC values from the previous revolution.

In step 720, the inverse impulse response for the servo control system is determined (as in step 30). In step 730, the measured PES RRO is circularly convolved with the inverse impulse response to obtain the WRRO associated with the ith revolution on a servo sector by servo sector basis. Next, in step 740, the WRRO values for each servo sector associated with the $i^{th}$ revolution are multiplied by the variable gain $\alpha_i$ which in this embodiment is $$\frac{1}{i}.$$

In step 750, the gain adjusted ERC values are then added to the ERC values from the previous revolution to obtain the ERC values for the current ($i^{th}$) revolution.

In step 760, a determination is made as to whether a predetermined number of revolutions have been performed. If not, then in step 770 i is incremented, the process returns to step 710 and the PES RRO is measured for the $i^{th}$ revolution using the ERC values from the previous revolution. If so, then in step 780 the ERC values calculated in step 750 are considered final and stored on the disk.

Until the predetermined number of revolutions is reached, the ERC values from the previous revolution are held in memory and electronically updated instead of being stored on the disk. However, such ERC values may be stored on the disk before reaching the predetermined number of revolutions. Furthermore, instead of writing the final ERC values to the disk, such ERC values may be stored in other locations in the disk drive, for example, in a look-up table or in memory.

The present invention may be implemented in the firmware of the controller 136 and/or the channel 140 or any other convenient place in the disk drive 100. In addition, the present invention may be implemented in a computer external to the disk drive 100.

The description that follows relates to modeling ERC residual errors and may be helpful in understanding the present invention. With some assumptions about the linearity of the servo control system, the residual error of the ERC estimate varies from iteration-to-iteration according to the following (frequency-domain) equation:

$$\delta_{i+1}(k) = \left[1 - \alpha_i \frac{1 + \hat{G}(k)}{1 + G(k)}\right]\delta_i(k) + \alpha_i[1 + \hat{G}(k)]\overline{NRRO_i(k)} \quad (4)$$

where $\delta_i(k)$ is the ERC error of the $i^{th}$ iteration at the $k^{th}$ harmonic of the spin-speed (k*fSpin, where fspin is the spin-frequency of the disk drive), G(k) is the servo control system's actual open-loop gain at frequency k*fspin, $\hat{G}(k)$ is an estimate of G(k), and $\overline{NRRO_i(k)}$ is the synchronously-averaged non-synchronous runout of the disk drive at the $k^{th}$ harmonic. The NRRO "contaminates" the measurement of $\overline{PES(m)}$, but averaging the measured PES over more than one revolution of the disk (as in the one-shot technique) reduces the effects of NRRO. In the limit of an infinite number of revolutions $\overline{NRRO_i(k)} \to 0$.

In the interest of identifying dimensionless factors that characterize the performance of an ERC algorithm, it is useful to define NSRC as the NRRO-source-level. The NSRC is the motion that the disk would have to undergo (relative to the transducer) to produce the observed NRRO (after the attenuation or amplification of the servo control system is applied). The NSRC is related to the NRRO by the following equation:

$$NRRO(k) = \frac{1}{1+G(k)} NSRC(k) \qquad (5)$$

In other words, the observed NRRO is the result of application of the closed-loop servo control system to the NSRC. Substitution for NRRO using equation (5) into equation (4) yields:

$$\delta_{i+1}(k) = \left[1 - \alpha_i \frac{1+\hat{G}(k)}{1+G(k)}\right]\delta_i(k) + \alpha_i \frac{1+\hat{G}(k)}{1+G(k)} \overline{NSRC_i(k)} \qquad (6)$$

This shows how both NRRO (depicted by NSRC) and model-errors (where $\hat{G}$ and $G$ are not identical) can contribute to ERC errors. For example, if $\hat{G}(k)$ is equal to G, equation (6) simplifies to:

$$\delta_{i+1}(k) = [1-\alpha_i]\delta_i(k) + \alpha_i \overline{NSRC_i(k)} \qquad (7)$$

For the one-shot technique ($\alpha=1$, single iteration), if the model is perfect ($\hat{G}(k)=G$) then the ERC error $\delta$ will be the (averaged) NRRO-source-level. With sufficient averaging (via an arbitrarily large number of revolutions of PES data collection), the error can be made arbitrarily small.

However, if there are significant model errors ($\hat{G}(k) \neq G(k)$), then even with "infinite" averaging of the NSRC, the ERC error $\delta$ will not go to zero with a single application of the ERC algorithm. With $\overline{NSRC(k)}$ made very small, equation (6) shows that the ERC error after a single iteration will be:

$$\delta_i(k) = \left[1 - \alpha_i \frac{1+\hat{G}(k)}{1+G(k)}\right]\delta_o(k) \qquad (8)$$

Equation (8) makes apparent that if the quantity $$\left[1 - \alpha_i \frac{1+\hat{G}(k)}{1+G(k)}\right]$$

is greater than unity magnitude, then each iteration will result in a larger ERC error than the previous one. If the quantity is smaller than unity magnitude, then a single iteration will reduce the ERC error, and with many iterations, the error will get very small.

With a constant value of the variable gain a and a finite amount of PES averaging (a finite number of revolutions of PES collection per iteration), the ERC error $\delta$ will tend towards a finite level ($\alpha$NSRC in the case of a perfect model). With an appropriate choice of the variable gain $\alpha_i$, however, the ERC error $\delta$ can tend towards zero as the number of iterations grows, even with finite model errors and NSRC levels.

As mentioned above, one such variable gain (but by no means the only one) is $$\alpha_i = \frac{1}{i}.$$

That is, the variable gain $\alpha_i$ starts out at unity for the first revolution (iteration of the ERC algorithm), becomes ½ on the second revolution, ⅓ on the third revolution, and so on. This sequence of variable gains, when used in equation (3), converges to zero ERC error in the limit of many iterations even with significant modeling errors in $\hat{G}$.

FIGS. 8–11 are simulations of the evolution of the residual ERC error $\delta$ for multiple revolutions of the disk for both the one-shot technique (A) and the variable gain technique of the present invention (B).

Figure 8:
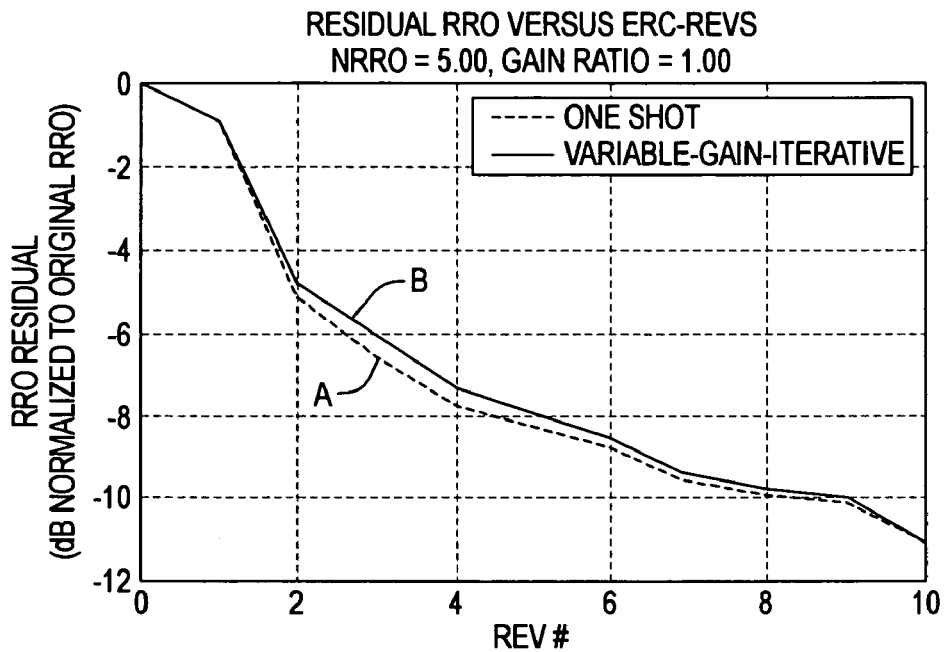
FIGS. 8–11 are simulations of residual ERC error for multiple revolutions of the disk which compare the conventional technique for determining ERC values with an embodiment of the present invention.

FIG. 8 shows that the residual ERC error is similar for the one-shot and variable gain techniques, with the one-shot technique showing about 0.5 dB better attenuation at 3 revolutions. A realistic level of NRRO relative to RRO was assumed (equal RMS values of each) and the servo control system model was assumed to be perfect ($\hat{G}=G$). The RRO and NRRO were assumed to be white noise. While this is an unrealistic assumption for both RRO and NRRO, the behavior of the simulation is representative of the servo control system for most types of RRO and NRRO.

Figure 9:
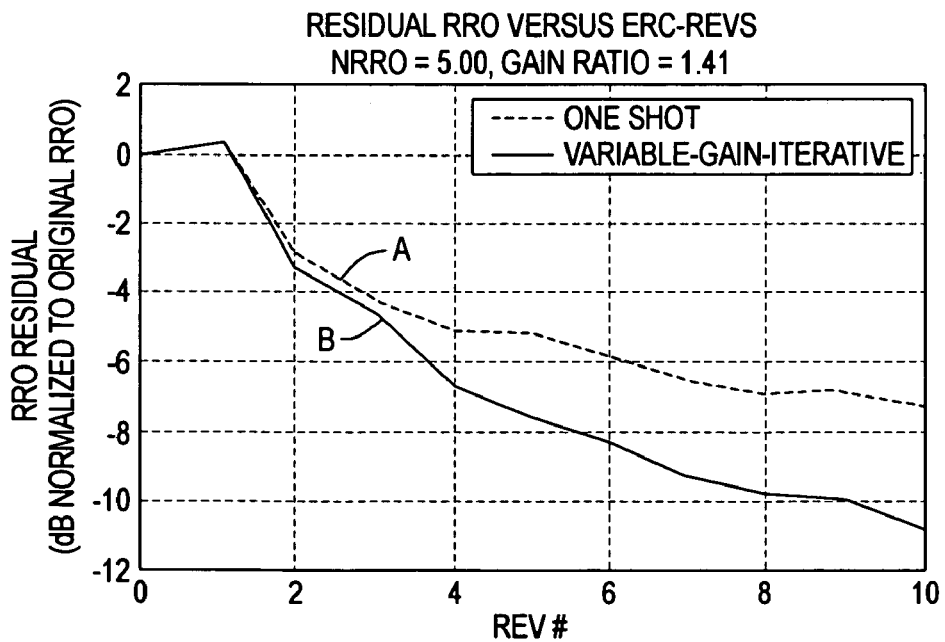

FIG. 9 shows a situation where a significant modeling error exists. Specifically, $\hat{G}$ equals 1.414 G (or a modeling error of 3 dB). In this case, the variable gain technique shows significant improvement over the one-shot technique. For example, there is a 2.5 dB improvement after 5 revolutions.

Figure 10:
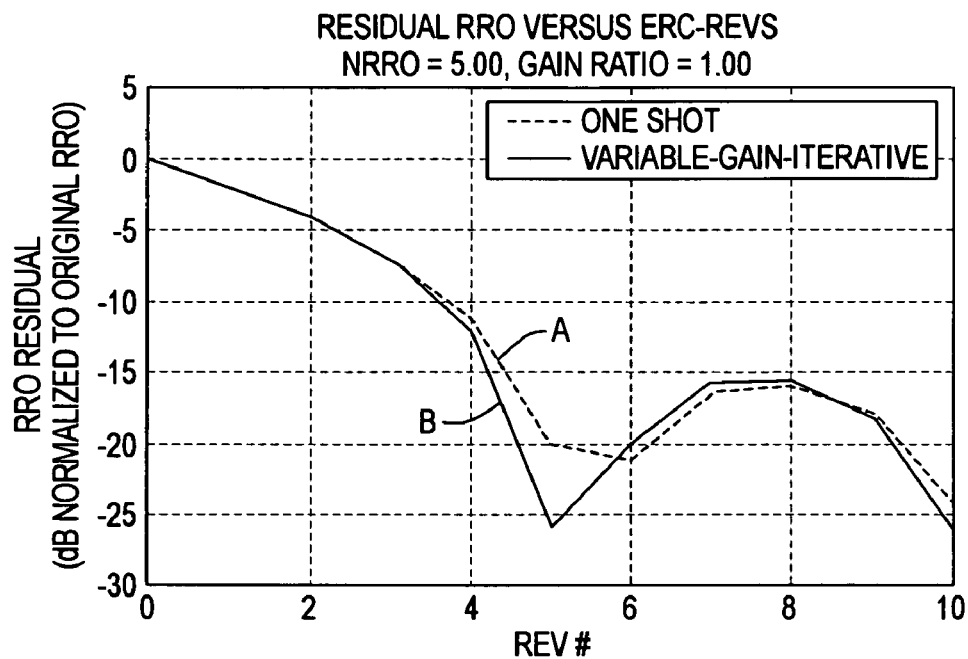
Figure 11:
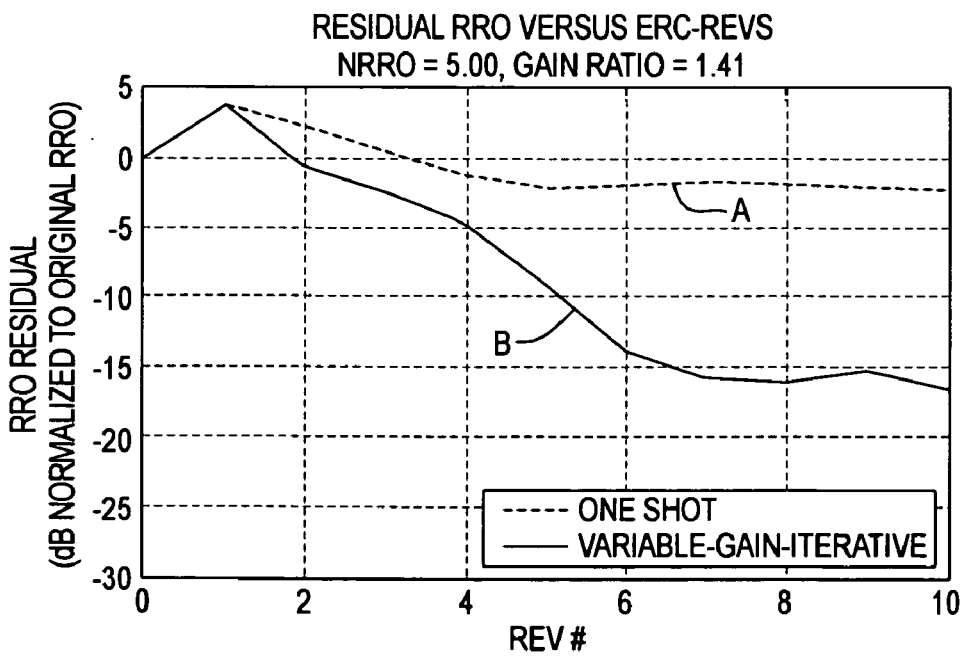

FIGS. 10 and 11 show ERC errors when the RRO and NRRO are pure sine waves of nearly identical frequency. Again, the variable gain technique shows improvement over the one-shot technique.

The present invention may be used with self-servo writing, especially when a first written track is used to write subsequent tracks, as described in U.S. patent application Ser. No. 09/905,564 filed Jul. 13, 2001 entitled "Partial Servo Write Fill In" and U.S. patent application Ser. No. 10/293,904 filed Nov. 12, 2002 entitled "Method and Apparatus for Partial Self-Servo Writing Using Servo Wedge Propagation," both of which are incorporated herein by reference.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method, comprising:
   providing a disk having a track written thereon; and
   determining an embedded runout correction (ERC) value for a servo sector on the track using variable gain during multiple revolutions of the disk, wherein the variable gain decreases for each revolution of the disk.

2. The method of claim 1, wherein the variable gain is a tunable parameter.

3. The method of claim 1, wherein the variable gain is $$\frac{1}{i}$$

and is the number of revolutions of the disk.

4. The method of claim 1, wherein the variable gain is $$\frac{1}{i+1}$$

and is the number of revolutions of the disk.

5. The method of claim 1, wherein the variable gain is initially one.

6. The method of claim 1, wherein the ERC value is based on an ERC value determined during a previous revolution of the disk using the variable gain.

7. The method of claim 1, wherein the number of revolutions of the disk is independent of the ERC value.

8. The method of claim 1, wherein the number of revolutions of the disk is predetermined.

9. The method of claim 1, wherein the number of revolutions of the disk is 4 to 8.

10. The method of claim 1, wherein the method is performed within a disk drive.

11. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

determining a first ERC value using the transducer to read a servo sector during a first revolution of the disk and using a variable gain as a scaling factor for the first ERC value, wherein the variable gain decreases for each revolution of the disk;

determining a second ERC value using the first ERC value and the transducer to read the servo sector during a second revolution of the disk and using the variable gain as a scaling factor for the second ERC value; and determining a final ERC value for the servo sector using the first and second ERC values, wherein the variable gain reduces error in the final ERC value.

12. The method of claim 11, wherein determining the first ERC value includes applying a first PES to an inverse transfer function of the servo control system, and determining the second ERC value includes applying a second PES to the inverse transfer function of the servo control system.

13. The method of claim 12, wherein determining the first PES includes using the transducer to read the servo sector during the first revolution of the disk, and determining the second PES includes using the transducer to read the servo sector during the second revolution of the disk.

14. The method of claim 11, wherein determining the final ERC value includes adding the first and second ERC values.

15. The method of claim 11, wherein the variable gain is $$\frac{1}{i}$$

and i is the number of revolutions of the disk.

16. The method of claim 11, wherein the variable gain is $$\frac{1}{i+1}$$

and i is the number of revolutions of the disk.

17. The method of claim 11, wherein the first and second revolutions of the disk are consecutive revolutions of the disk.

18. The method of claim 11, wherein the number of revolutions of the disk used to determine the final ERC value is independent of the final ERC value.

19. The method of claim 11, wherein the number of revolutions of the disk used to determine the final ERC value is predetermined.

20. The method of claim 11, wherein determining the first ERC value includes using a final ERC value for a track that excludes the servo sector.

21. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

generating a first PES using the transducer to read a servo sector during a first revolution of the disk;

determining a first ERC value for the servo sector using the first PES and a variable gain as a scaling factor for the first ERC value, wherein the variable gain decreases for each revolution of the disk;

generating a second PES using the first ERC value and the transducer to read the servo sector during a second revolution of the disk;

determining a second ERC value for the servo sector using the second PES and the variable gain as a scaling factor for the second ERC value; and determining a final ERC value for the servo sector using the first and second ERC values, wherein the variable gain reduces error in the final ERC value.

22. The method of claim 21, wherein determining the first ERC value includes applying the first PES to an inverse transfer function of the servo control system, and determining the second ERC value includes applying the second PES to the inverse transfer function of the servo control system.

23. The method of claim 21, wherein determining the final ERC value includes adding the first and second ERC values.

24. The method of claim 21, wherein determining the final ERC value includes:

generating a third PES using the first and second ERC values and the transducer to read the servo sector during a third revolution of the disk;

determining a third ERC value for the servo sector using the third PES and the variable gain as a scaling factor for the third ERC value; and determining the final ERC value using the first, second and third ERC values.

25. The method of claim 21, wherein the variable gain is $$\frac{1}{i}$$

and i is the number of revolutions of the disk.

26. The method of claim 21, wherein the variable gain is $$\frac{1}{i+1}$$

and i is the number of revolutions of the disk.

27. The method of claim 21, wherein the first and second revolutions of the disk are consecutive revolutions of the disk.

28. The method of claim 21, wherein the number of revolutions of the disk used to determine the final ERC value is predetermined.

29. The method of claim 21, wherein determining the first ERC value includes using a final ERC value for a track that excludes the servo sector.

30. The method of claim 21, including performing the method on a sector-by-sector basis for each servo sector in a track that includes the servo sector.

31. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

generating a first PES using the transducer to read a servo sector during a first revolution of the disk;

determining a first ERC value for the servo sector by applying the first PES to an inverse transfer function of the servo control system and by using a variable gain as a scaling factor for the first ERC value, wherein the variable gain decreases for each revolution of the disk;

generating a second PES using the first ERC value and the transducer to read the servo sector during a second revolution of the disk;

determining a second ERC value for the servo sector by applying the second PES to the inverse transfer function of the servo control system and by using the variable gain as a scaling factor for the second ERC value;

determining a final ERC value for the servo sector using the first and second ERC values, wherein the variable gain reduces error in the final ERC value; and writing the final ERC value to the disk drive.

32. The method of claim 31, wherein determining the first ERC value includes convolving the first PES with an inverse impulse response of the servo control system, and determining the second ERC value includes convolving the second PES with the inverse impulse response of the servo control system.

33. The method of claim 31, wherein determining the final ERC value includes adding the first and second ERC values.

34. The method of claim 31, wherein determining the final ERC value includes:

generating a third PES using the first and second ERC values and the transducer to read the servo sector during a third revolution of the disk;

determining a third ERC value for the servo sector by applying the third PES to the inverse transfer function of the servo control system and by using the variable gain as a scaling factor for the third ERC value; and determining the final ERC value using the first, second and third ERC values.

35. The method of claim 31, wherein the variable gain is one during the first revolution of the disk.

36. The method of claim 31, wherein the variable gain is $$\frac{1}{i}$$

and i is the number of revolutions of the disk.

37. The method of claim 31, wherein the variable gain is $$\frac{1}{i+1}$$

and i is the number of revolutions of the disk.

38. The method of claim 31, wherein the first and second revolutions of the disk are consecutive revolutions of the disk.

39. The method of claim 31, wherein the number of revolutions of the disk is independent of the ERC value.

40. The method of claim 31, wherein the number of revolutions of the disk is predetermined.

41. The method of claim 40, wherein the number of revolutions of the disk is 4 to 8.

42. The method of claim 31, wherein writing the final ERC value to the disk drive includes storing the final ERC value in the servo sector.

43. The method of claim 31, wherein writing the final ERC value to the disk drive includes storing the final ERC value in a look-up table.

44. The method of claim 31, wherein determining the first ERC value includes using a final ERC value for a track that excludes the servo sector.

45. The method of claim 31, wherein determining the first ERC value includes using a final ERC value for a track that excludes the servo sector in response to determining track-to-track correlation of written-in repeatable runout (WRRO).

46. The method of claim 31, wherein the method is performed within the disk drive.

47. The method of claim 31, wherein the method is performed within and outside the disk drive.

48. The method of claim 31, including performing the method on a sector-by-sector basis for each servo sector in a track that includes the servo sector.

49. The method of claim 31, including using the final ERC value to position the transducer as the transducer writes servo information to the disk.

50. The method of claim 31, including using the final ERC value to position the transducer as the transducer writes user data to a data field that is adjacent to the servo sector.

51. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

determining i estimated ERC values using the transducer to read a servo sector and generate a PES and applying the PES to an inverse transfer function of the servo control system during i revolutions of the disk, wherein the estimated ERC values include an initial estimated ERC value, each estimated ERC value is determined using the transducer to read the servo sector during a separate revolution of the disk, each estimated ERC value is determined by being multiplied by a variable gain, each estimated ERC value after the initial estimated ERC value is determined using the previous estimated ERC value, the variable gain decreases for each revolution of the disk and i is predetermined;

determining a final ERC value for the servo sector using the estimated ERC values;

storing the final ERC value in the disk drive;

using the servo sector and the final ERC value to position the transducer as the transducer writes user data to a data field that is adjacent to the servo sector; and using the servo sector and the final ERC value to position the transducer as the transducer reads the user data from the data field.

52. The method of claim 51, wherein applying the PES to the inverse transfer function includes convolving the PES with an inverse impulse response of the servo control system.

53. The method of claim 51, wherein determining the final ERC value includes adding each estimated ERC value after the initial estimated ERC value to the previous estimated ERC value.

54. The method of claim 51, wherein the variable gain is one during the first revolution of the disk when i is one.

55. The method of claim 51, wherein the variable gain is less than one after the first revolution of the disk when i is greater than one.

56. The method of claim 51, wherein the variable gain is $$\frac{1}{i}.$$

57. The method of claim 51, wherein the variable gain is $$\frac{1}{i+1}.$$

58. The method of claim 51, wherein the revolutions of the disk are consecutive revolutions of the disk.

59. The method of claim 51, wherein the number of revolutions of the disk is at least 4.

60. The method of claim 51, wherein the number of revolutions of the disk is at most 8.

61. The method of claim 60, wherein the number of revolutions of the disk is 4 to 8.

62. The method of claim 51, including storing the final ERC value in the servo sector.

63. The method of claim 51, including storing the final ERC value in a look-up table.

64. The method of claim 51, wherein determining the initial estimated ERC value includes using a final ERC value for a track that excludes the servo sector.

65. The method of claim 51, wherein determining the initial estimated ERC value includes using a final ERC value for a track that excludes the servo sector in response to determining track-to-track correlation of written-in repeatable runout (WRRO).

66. The method of claim 51, wherein the method is performed within the disk drive.

67. The method of claim 51, wherein the method is performed within and outside the disk drive.

68. The method of claim 51, including performing the method on a sector-by-sector basis for each servo sector in a track that includes the servo sector.

69. The method of claim 51, including using the final ERC value to position the transducer as the transducer writes servo information to the servo sector.

70. The method of claim 51, including using the final ERC value to position the transducer as the transducer writes servo information to the servo sector during self-servo writing by the disk drive.

* * * * *